March 19, 1935.  A. K. THOMAS  1,994,797
APPARATUS FOR FEEDING AND WEIGHING MATERIAL
Filed Nov. 27, 1931   2 Sheets-Sheet 1
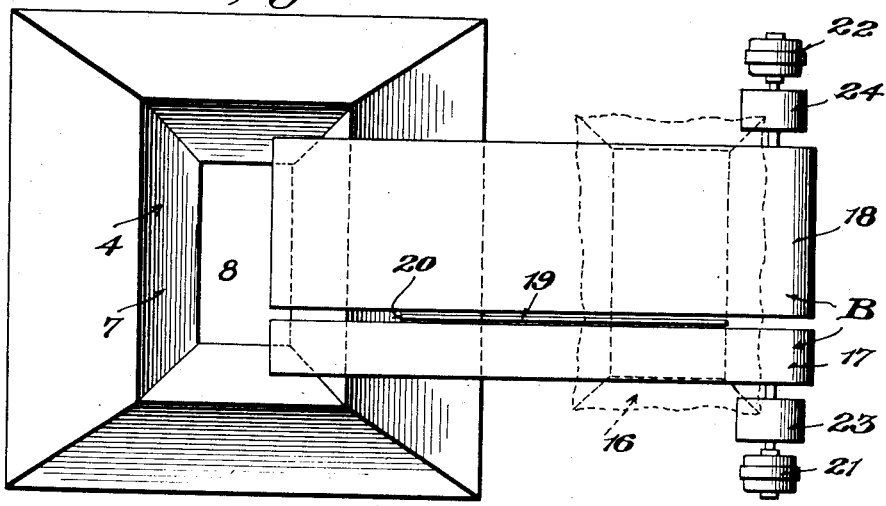
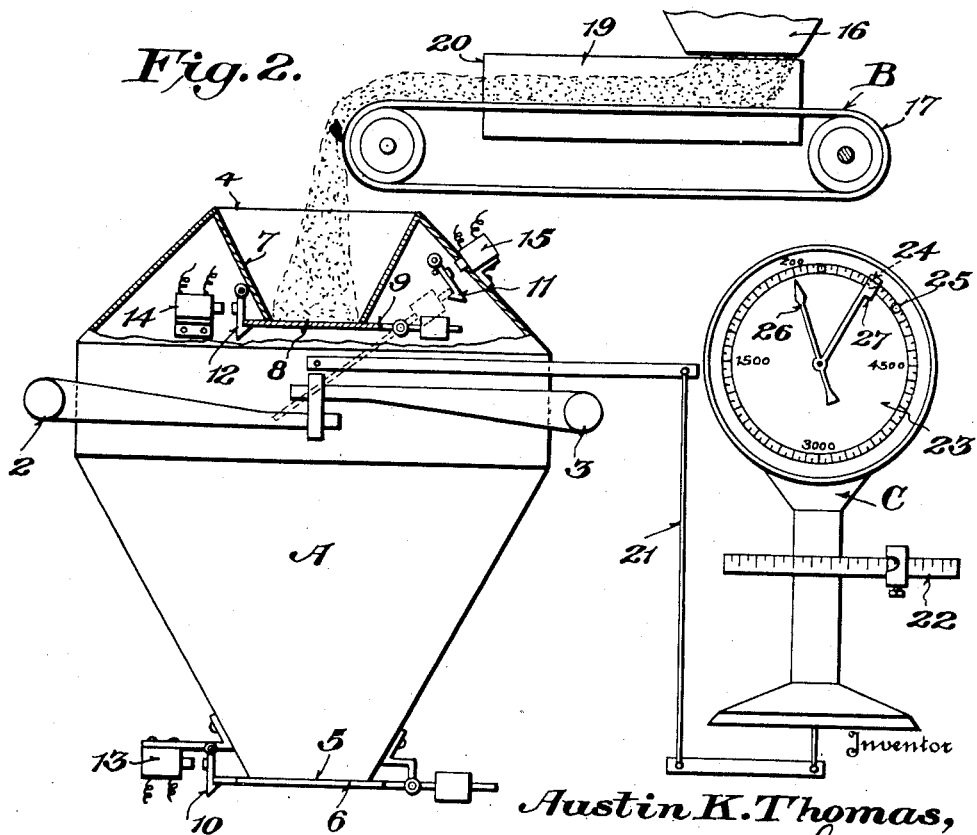
Inventor
Austin K. Thomas,
By William T. Geier
Attorney March 19, 1935.  A. K. THOMAS  1,994,797
APPARATUS FOR FEEDING AND WEIGHING MATERIAL
Filed Nov. 27, 1931   2 Sheets-Sheet 2

INVENTOR
Austin K. Thomas
BY
ATTORNEYS

Patented Mar. 19, 1935

1,994,797

UNITED STATES PATENT OFFICE 1,994,797

APPARATUS FOR FEEDING AND WEIGHING MATERIAL

Austin K. Thomas, Upper Darby, Pa., assignor to Blaw-Knox Company, Pittsburgh, Pa., a corporation of New Jersey Application November 27, 1931, Serial No. 577,681

2 Claims. (Cl. 249—9)

This invention relates to improvements in apparatus for feeding and weighing material, and more particularly to the feeding and weighing of concrete ingredients and aggregates preparatory to the mixing thereof, although same may be readily adapted to the handling of other materials and/or liquids.

In the mixing of industrial concrete for use on roadways, buildings, dams, etc., it is customary to mix or proportion the ingredients at a central plant, after which the mixture is transported by any suitable means to its point of use. These mixing plants usually consist of a large storage bin for the materials, beneath which is disposed a feeder for directing the latter into a weigh hopper of large capacity and from which the weighed or measured materials are discharged into a mixer.

Heretofore, it has been found to be practically impossible to definitely control the speedy gravitative transfer of material from the storage bin to the weigh hopper, and at the same time obtain an accurate measurement by weight of the material. This inaccuracy is due for the most part to the existence of the column of material which is in suspension between the material at rest in the bottom of the weigh hopper and the feeding means, and also in part to the impact of the material striking the bottom of the weigh hopper, this latter action of the material resulting in undue movement of the scale beam.

For example, with the apparatus at present in use, if it is desired to obtain 3000 lbs. of material, the scales associated with the weigh hopper are set at the required reading and the feeder put in motion to deliver material from the storage bin to the weigh hopper. When the scales record or indicate a weight of 3000 lbs., the feeding means is brought to rest, with the consequent loss or waste of the material remaining in suspension between the feeding means and the material at rest on the bottom of the weigh hopper, for it will be readily appreciated that the weight of the material at rest is that which actually affects the scale mechanism. Thus it will be seen, a huge loss results from this column of material which is still in suspension when the scales record the required amount, and which continues to flow into the weigh hopper after the movement of the feeding means is discontinued.

An attempt has been made in the prior art to eliminate this loss by slowing the speed of the feeding means, without apparent result, for the reason that retarding the speed of the feeding means further results in loss of time without eliminating the column of suspended material. Further, with the methods or apparatus at present in use it is practically impossible to obtain accurate measurement by weight, for the reason that the amount of material in suspension varies according to the height of the material at rest on the bottom of the hopper and the speed at which same is being fed. In large building projects of whatever character, time as well as the saving of material, is an extremely important factor, and with the present day methods these factors are lost.

The primary object of this invention therefore, is the provision of apparatus of the above character, which will overcome the foregoing objections as to the column of suspended material and the impact resulting from the material striking the bottom of the hopper, and also which will substantially eliminate the column of suspended material occurring between the weigh hopper and the feeding means, or reduce the loss to absolute minimum.

A further and important object of this invention is to provide an automatic apparatus of the above character in which the weigh hopper has means associated therewith to intercept a portion of the predetermined load of material being fed to the weigh hopper.

Another important object of this invention is to provide an apparatus of the above character in which the feeding of the material is automatically controlled simultaneously with the intercepting of the suspended material.

Another important object of this invention is to provide an apparatus of the above character in which the feeding means is composed of a plurality of movable members operable in unison as a single unit or independently of each other and which operation is controlled by the movement of the material intercepting means.

Still another important object of this invention is to provide an apparatus of the above character in which the material feeder is formed with means to substantially eliminate the droppage of material therefrom while the same is at rest.

Other objects will be later set forth and manifested throughout the course of the following description and drawings, in which:

Figure 1 is a top plan view of the weigh hopper and feeding means, with a material storage bin shown in dotted lines;

Figure 2 is a side elevation of the apparatus with parts broken away to show one form of material intercepting means, and with associated scale mechanism;

Figure 3:
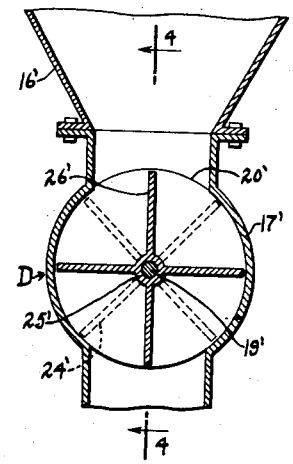
Figure 3 is a sectional view of a modified form of a material feeding means, taken on line 3—3 of Figure 4.

Referring in detail to the drawings wherein is disclosed one simple form of apparatus for accomplishing the foregoing objects, A designates a main weigh hopper supported by a pair of movable scale arms 2 and 3. The hopper A is formed with a material inlet 4 and a discharge opening 5, the latter being closed by a movable counterbalanced gate or door 6.

Associated with the hopper A and movable therewith is an auxiliary hopper or material intercepting means 7 having an open bottom 8, the latter being closed by a movable counterbalanced gate or door 9. While pivoted closures are shown for controlling the discharge openings 5 and 8, it is to be understood that any suitable type of closure may be used in place thereof.

Supported by the hopper A and disposed in the path of movement of the gate 6, is a pivoted latch member 10 adapted to hold the gate normally closed. Secured to the main hopper adjacent the rear end of the gate 9 is a pivoted latch member 11, which is adapted to hold the gate in its normally open position as indicated by the dotted lines as shown in Fig. 2. Also carried by the main hopper adjacent the front end of the gate 9 is a latch member 12 arranged to retain the gate in its closed position for intercepting a portion of the material being fed into the main hopper A.

The latches 10, 11, and 12 are adapted to be moved to their inoperative or non-latching positions by electro-magnetic trip members 13, 14, and 15 carried by the main hopper, the control circuit for the same being hereinafter more fully described.

Positioned above and closely adjacent to the main hopper A is a material feeding unit B having one end disposed in material discharging relation thereto, while its opposite end extends beneath a storage bin 16 for receiving material from the latter. The material feeding unit B is composed of a pair of horizontally extending endless belts or conveyors 17 and 18, disposed in slightly spaced parallel relation to each other, the belt 18 being of an appreciably greater width or area than the belt 17 for a purpose to be later described.

Disposed across the discharge opening of the bin 16 and extending between the endless belts 17 and 18 is a vertically positioned elongated division plate or partition 19 having its free end 20 terminating or spaced a predetermined distance from the discharge ends of the belts. The plate 19 is of a height equal to or greater than the height of the material carried on the belts.

The belts 17 and 18 are driven by motors 21 and 22, through intermediate reduction gearing 23 and 24 respectively, this latter arrangement permitting simultaneous operation of the belts at the same uniform speed, whereby the belts may be moved as a single unit or operated independently of each other as occasion requires.

Figure 4:
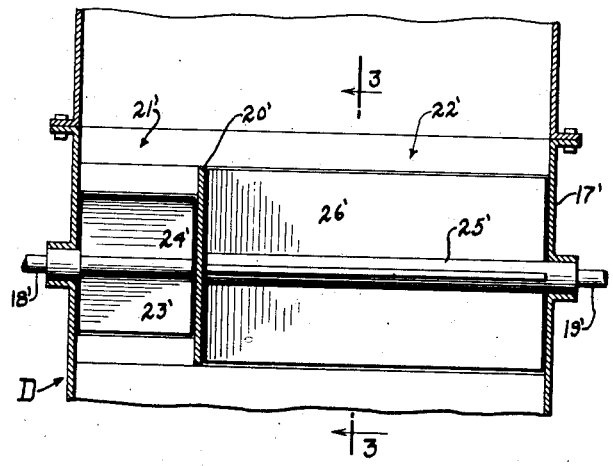
Figure 4 is a sectional view on line 4—4 of Figure 3.

In Figures 3 and 4, is shown a modified form of a material feeding unit D, which may be directly attached to a storage bin 16' by bolts or other suitable fastening means. This feeding unit is composed of a cylindrical trap chamber 17' formed with inlet and outlet ports and having a pair of telescoping shafts 18' and 19' rotatably journaled therein, the latter shaft having its free end abutting a plate or partition 20' rigidly mounted within the trap chamber adjacent one wall of the latter. The plate 20' divides the trap chamber 17' so as to provide a small discharge port 21' and a large discharge port 22'. Mounted upon the shaft 18' within the discharge port 21' is a rotary valve 23' formed of a plurality of radially spaced blades 24' while mounted upon the shaft 18' within the large discharge port 22' is a rotary valve 25' formed of a plurality of spaced blades 26'. The shafts and valves are driven in identically the same manner as described in the operation of belts 17 and 18 and therefore no further description of their operation is deemed necessary. However, if, when stopping the motion of the rotary valves, the blades are not in alinement, as shown in Figure 3, the division plate 20' will prevent the material contained in the bin 16' from escaping from the latter in a tortuous path between the blades 24' and 26'.

Operatively connected to the movable hopper A through the arms 2 and 3 and linkage 21 is a weigh scale C having the beam 22 and graduated dial 23. The dial 23 to the right of zero is provided with a pair of spaced slots or openings 24 and 25 behind each of which is located a photoelectric light sensitive cell, not shown, the latter providing independent means to actuate electrical relays in the control circuit, when light rays projected through the openings are intercepted.

Mounted for movement in a counterclockwise direction over the face of the graduated dial by the usual mechanism, is an indicating pointer 26 having rigidly affixed thereto, in spaced relation, a light ray interceptor 27. The interceptor 27 is in the form of a paddle or shutter and of sufficient size to cover each of the openings 24 and 25 successively during continued movement of the pointer 26, whereby to intercept light rays projected through the openings, from any suitable source.

Figure 5:
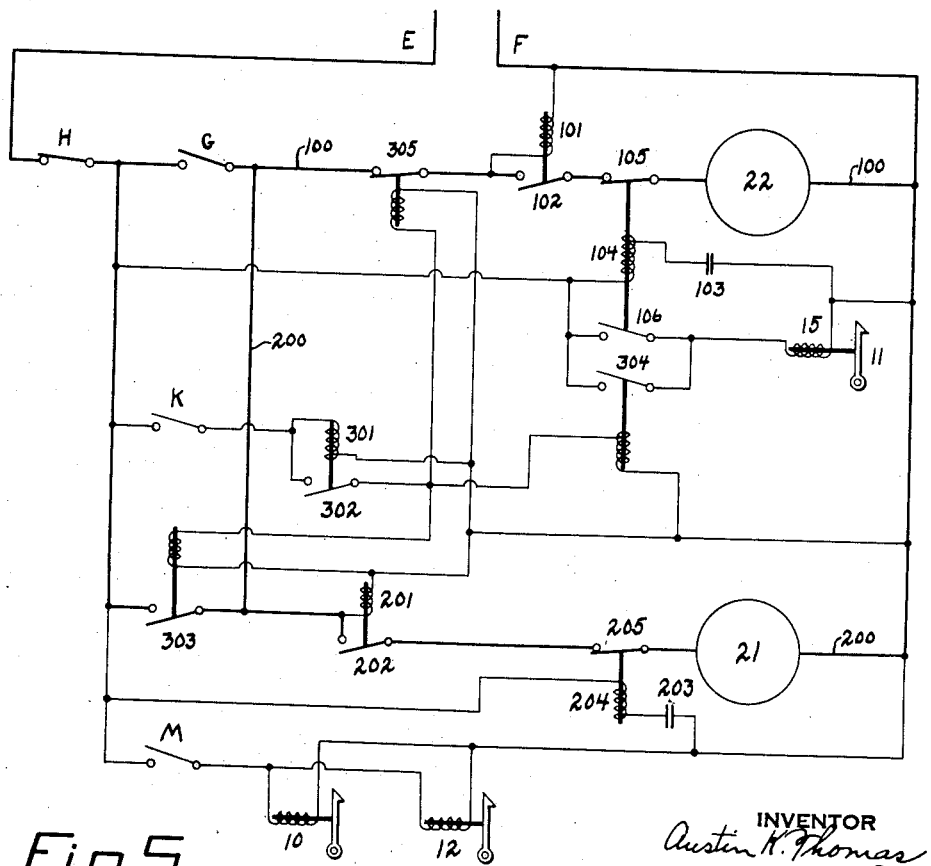
Figure 5 is a diagrammatic view of one form of electric circuit for controlling the apparatus.

One form of electric circuit for controlling the various movable parts and in which the photo-electric cells are incorporated, is shown in Figure 5, and in which E and F indicate the usual power lines connected to any suitable source of electric current, not shown.

Broadly, the operating circuit includes a pair of motor circuits 100 and 200 arranged and connected in parallel with the power lines E and F.

In operation by closing switch G, magnetic starting coils 101 and 201 are energized to close normally open interlocks 102 and 202 to complete the parallel circuit in which switch G is located, thereby starting the motors 21 and 22, shown in Figure 1.

As soon as sufficient material is received in hopper A, to cause member 27 to pass over opening 24, the light rays which are normally projected on to photo-electric cell relay 103 are intercepted, to de-energize coil 104 to open the normally closed control relay 105, and thereby stopping the operation of the large feeder belt 18. At the same time, normally open control relay 106 is instantly closed to complete the energizing circuit leading to trip coil 15 to actuate latch member 11, thus closing gate 9.

When sufficient material has been dribbled into the auxiliary hopper 7, member 27 intercepts the light rays passing through opening 25 on to photo-electric cell 203, de-energizing coil 204 to open the normally closed control relay 205, thereby to stop motor 21 and small feeder belt 17, thus completing the feeding and weighing of the material.

Should it become necessary, for any reason, to stop the entire operation of the apparatus, same is accomplished by pushing button H, to de-energize the entire circuit.

Occasionally it becomes necessary to feed and weigh an amount of material equal to or less than the amount required to intercept the light rays projected on to photo-electric cell 103. When this occurs, gate 9 must be closed without starting the large feeder belt 18. This is accomplished by pushing button K to complete the circuit leading to coil 301 whereby to close the normally open interlock 302 to create a circuit paralleling that in which push button K is located. The closing of interlock 302, also causes normally open interlock 202 and normally open control relay 303 to close whereby to start motor 21 and belt 17, and at the same time opening normally closed control relay 305 to prevent the starting of motor 22. The closing of interlock 302 also causes normally open control relay 304 to close, thereby actuating coil 15, and latch 11 to permit the closing of gate 9. It will be understood that the light intercepting member 27 in this particular case is already past the opening 24 and therefore the only light rays to be intercepted are those which pass through opening 25. As the material is dribbled into the auxiliary hopper 7, the member 27 moves to a position over opening 25 intercepting the light rays projected on to photo-electric relay cell 203, causing the coil 204 to open the normally closed relay 205. This action stops the operation of motor 21, and small belt 17 as the desired weight is obtained.

To discharge the material from the weigh hopper, push button M is actuated to energize the trip coils controlling latch members 10 and 12 to release the latter, whereupon the gates 6 and 9 are permitted to open under the force exerted by the weight of the material.

In the application and operation of the apparatus disclosed, it is assumed, by way of example, that it is desired to obtain and accurately measure 3000 lbs. of material. In starting the operation, the gate 6 is closed and gate 9 is opened, as shown in dotted lines in Fig. 2. The indicating pointer 26 carrying with it the light ray interceptor 27 is moved in a counterclockwise direction until the pointer reaches the legend 3000 lbs. on the dial 23. The switch G is manually actuated to cause electric energy to pass simultaneously through the power lines E and F to start both motors 21 and 22, which latter, being driven at the same uniform speed through reduction gearing 23 and 24 causes movement of the belts 17 and 18 in a direction to feed material from the bin 16 into main hopper A through auxiliary hopper 7. It will be here noted that belt 18 is of considerably greater width than belt 17 for the purpose of feeding a maximum quantity of material during the simultaneous operation of both belts, within the required cycle of time, while obtaining the necessary accuracy.

As the body of material continues to increase within the main hopper, the pointer 26 and interceptor 27 will move in a clock-wise direction toward the zero mark. Due to the fixed spaced relation of the members 26 and 27, when the pointer 26 has reached the legend 200, thereby indicating that 2800 lbs. of material has been deposited in the main hopper A, the light ray interceptor 27 will at the same time have reached a position over the opening 24, to cut off the rays of light being projected on to the photo-electric cell. Immediately this occurs, the electromagnet 15 or trip coil is energized to release latch 11 to permit counter-balanced gate 9 to close and be locked in position by latch 12 while at the same time the circuit to motor 22 is broken through operation of the circuit breaker 105 to stop the further movement of the large belt 18.

The small belt 17 continues to feed or dribble material into auxiliary hopper 7 until the pointer 26 reaches the legend zero, whereupon the member 27, having at the same time moved to a position to intercept the light rays being projected through the second opening 25, will cause the operation of circuit breaker 205 to stop the operation of motor 21, and prevent the feed of additional material to the weigh hopper.

The material contained in the auxiliary and main hoppers may be discharged simultaneously by manual operation, or through the control circuit shown in Figure 5. This latter circuit is connected to electro-magnetic trip coils 13 and 14 in a manner to permit automatic release of latches 10 and 12 upon actuation of push button M.

The purpose of the partition plate 19 is to allow the material on the belt 17 to move easily with the continued movement of the latter while the large belt 18 is stationary, thus preventing frictional checking off and movement of the material on the belt 18 when same is stationary. This arrangement permits a more accurate feeding or dribbling of material into the auxiliary hopper 7 and prevents movement of large quantities of material from the stationary belt 18, which would otherwise affect and destroy the accurate measurement of materials during the cycle of operation. Further by terminating or spacing the end of the plate 19 a predetermined distance from the ends of the belts, it allows the material, on the moving belt 17, after it has passed the end of the plate to push off any material just hanging on the end of the then stationary belt 18 into the weigh hopper. Otherwise, as stated above, large quantities of material would continue to fall from the belt 18 after the weighing operation has ceased.

From the foregoing it will be seen that the column of material in suspension which occurs with devices at present in use, is substantially eliminated by the herein disclosed apparatus, due to the fact that the movement of a predetermined portion of the material being measured is intercepted at a point adjacent the feeder which material is then gradually fed into the intercepting means or auxiliary hopper to complete the accurate measurement of the load.

Manifestly, the construction shown is capable of considerable modification and such modification as is considered within the scope and meaning of the appended claims is also considered within the spirit and intent of the invention.

What is claimed, is:

1. An apparatus for weighing predetermined loads, including a main weigh hopper having a discharge opening, closure means for said discharge opening, an auxiliary hopper associated with the main hopper and having an outlet opening into the latter, closure means for said outlet, means for feeding the major portion of the load of material through the auxiliary hopper and into the main hopper, means for actuating said feeding means, electro-magnetic means for closing the auxiliary hopper outlet, means for feeding the remainder of the load into the auxiliary hopper, and electro-magnetic means for stopping said last mentioned feeding means when the said remainder of the load has been received in the auxiliary hopper.

2. An apparatus for weighing predetermined loads, including a movable main weigh hopper having a discharge opening, closure means for said discharge opening, an auxiliary hopper associated with the main hopper and having an outlet opening into the latter, closure means for said outlet, means for feeding the major portion of the load of material through the auxiliary hopper and into the main hopper, means for actuating said feeding means, electro-magnetic means for closing the auxiliary hopper outlet, means for feeding the remainder of the load into the auxiliary hopper, means associated with the main hopper for actuating the electro-magnetic means, and means for opening both of said closure means so as to discharge the material from both of said hoppers.

AUSTIN K. THOMAS.